(12) United States Patent
Oishi

(10) Patent No.: US 8,806,173 B2
(45) Date of Patent: Aug. 12, 2014

(54) ELIMINATION OF DUPLICATE WRITTEN RECORDS

(75) Inventor: Yutaka Oishi, Yamato (JP)

(73) Assignee: International Business Machines Corporation, Armonk, NY (US)

(*) Notice: Subject to any disclaimer, the term of this patent is extended or adjusted under 35 U.S.C. 154(b) by 293 days.

(21) Appl. No.: 13/216,482

(22) Filed: Aug. 24, 2011

(65) Prior Publication Data

US 2012/0106309 A1    May 3, 2012

(30) Foreign Application Priority Data

Oct. 28, 2010 (JP) ................................ 2010-242238

(51) Int. Cl.
*G06F 12/00* (2006.01)

(52) U.S. Cl.
USPC .................. 711/216; 711/154; 711/E12.018; G9B/20.047

(58) Field of Classification Search
None
See application file for complete search history.

(56) References Cited

U.S. PATENT DOCUMENTS

| 8,281,066 B1* | 10/2012 | Trimmer et al. ............... 711/103 |
| 2007/0255758 A1* | 11/2007 | Zheng et al. .................. 707/200 |
| 2009/0019246 A1* | 1/2009 | Murase ........................ 711/162 |
| 2009/0204765 A1* | 8/2009 | Gupta et al. .................. 711/133 |
| 2012/0330907 A1* | 12/2012 | Nakamura et al. ............. 707/692 |

FOREIGN PATENT DOCUMENTS

| JP | 2009020858 A | 1/2008 |
| JP | 2008282382 A | 11/2008 |
| JP | 2009059096 A | 3/2009 |
| JP | 2009181148 A | 8/2009 |
| JP | 2011510405 A | 3/2011 |

* cited by examiner

*Primary Examiner* — Reginald Bragdon
*Assistant Examiner* — Brendan Lillis
(74) *Attorney, Agent, or Firm* — Griffiths & Seaton PLLC

(57) ABSTRACT

A storage device includes first and second buffers. A request to write a new record from a host is received. A hash value (new S) of the new record is calculated. The hash value (new S) of the new record is checked to determine if the hash value exists in a second buffer. If the new S exists in the second buffer, the new record is compared with a record stored in the second buffer corresponding to the new S to check if the new record and the stored record in the second buffer match each other. If the new record and the stored record match each other, a pointer (a record number) is written as write data of the new record to the recording medium. The pointer points to the record already stored in any one of a recording medium and the second buffer.

20 Claims, 4 Drawing Sheets

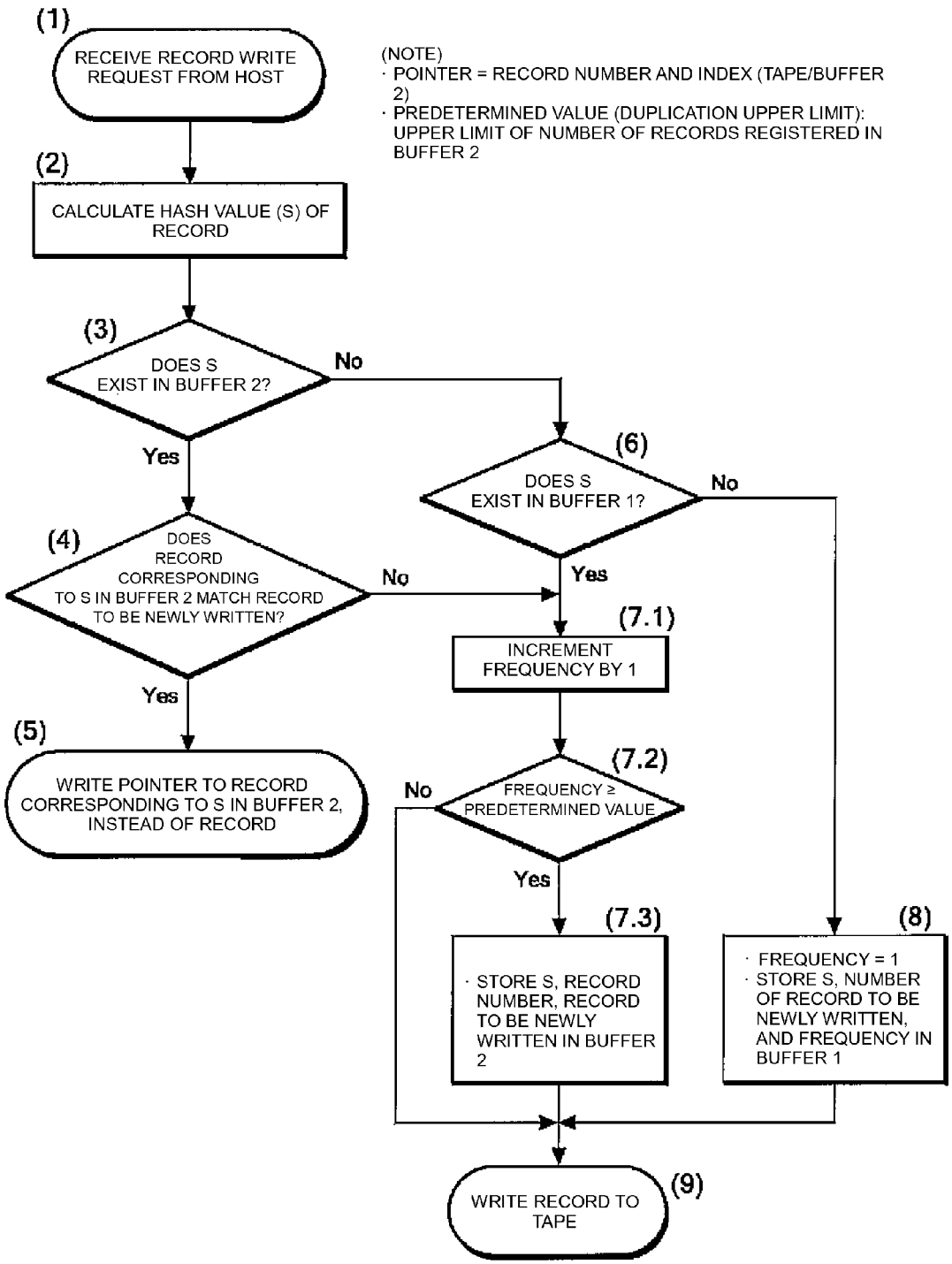

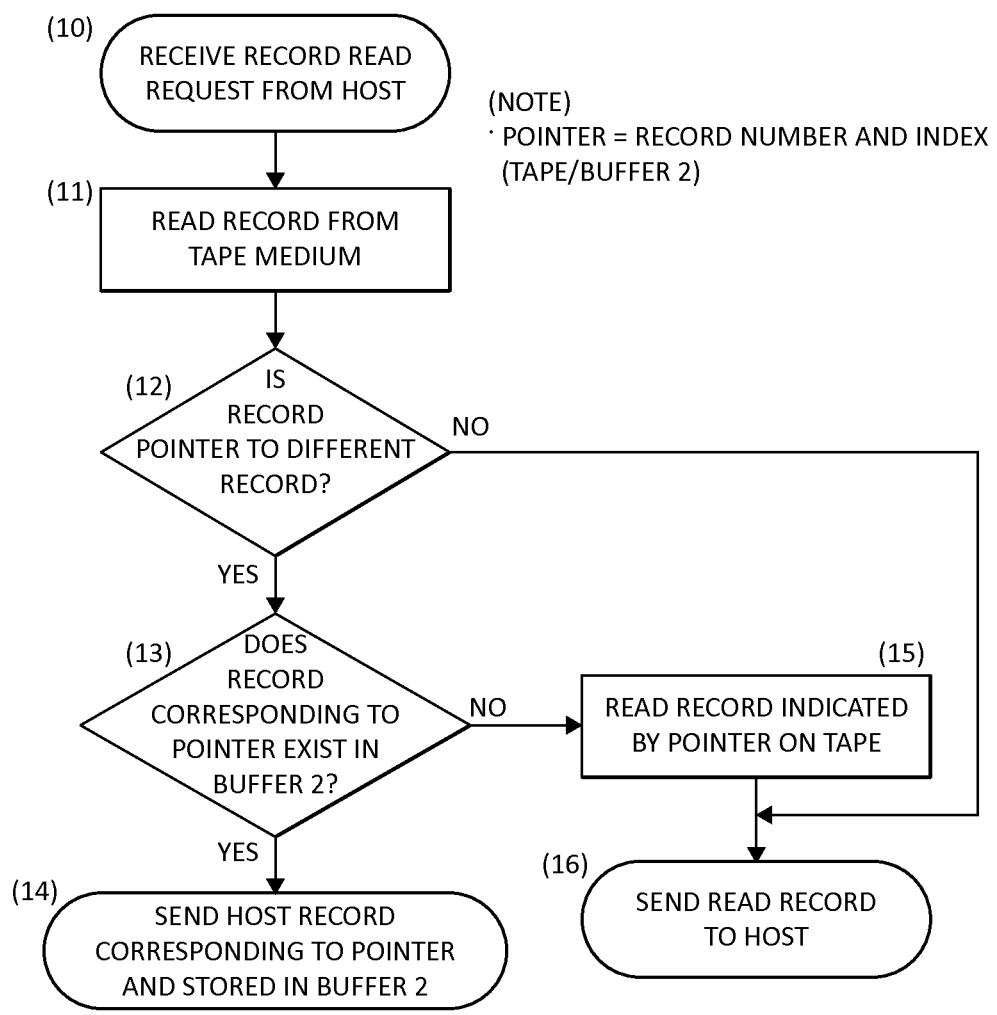

ELIMINATION OF DUPLICATE WRITTEN RECORDS

PRIORITY CLAIM

This application claims priority to Japanese Patent Application No. 2010-242238, filed Oct. 28, 2010, which is hereby incorporated by reference in its entirety.

BACKGROUND OF THE INVENTION

1. Field of the Invention

The present invention relates generally to computers, and more particularly to mechanisms for reducing and/or eliminating duplicate written records in a computing storage environment.

2. Description of the Related Art

So-called "deduplication" (also referred to herein as "dedup") is a technique of reducing a used amount in storage. In this technique, when there are multiple files having the same content, a storage does not store the data of the same contents in as many locations as the files, unlike a conventional technique, but stores the data in only one location. Whichever file of the multiple files is referred to in the storage, the same entity is referred to. Only when the data of any of the files is changed, the content thereof is newly stored in a different location. This technique is one for reducing a used amount in the storage capacity as a whole. A used amount that can be reduced in the technique depends on the content of the stored data, but can be reduced to one tenth to one twentieth of that in the conventional technique in the case of particular usage.

In writing data to a tape, a host firstly writes data to a tape drive in variable-length units which are termed as records. The tape media has a capacity of about 1 TB. When dedup functions in the tape drive, there is a problem that it takes time to check if data to be newly written is the same as data already written.

A tape drive (for example, the IBM® TS 1120, which is a tape drive for enterprise use) is a sequential device configured to execute write and read operations sequentially in physical locations in a tape medium (a storage device configured to store records sequentially in physical locations in a recording medium). Generally, the dedup technique requires generation, comparison, and the like of hash values showing whether or not write data is duplicate data of recorded data. The sequential device receives data to be newly written from an upper-layer device, and the data is expected to be identical to data already written to a tape medium. In this case, the sequential device requires an average of approximately two minutes to move the tape to a certain position for reading the already written data and then return the tape to the previous position for writing data. For this reason, there is no tape drive product so far which alone supports the dedup function.

Conventional techniques include a method of copying only a difference between two storages for synchronization of the two storages in order to reduce power consumption. In this method, the dedup is not executed by a tape drive alone, and a method of backing up already deduplicated data to a tape or the like. This technique is not one in which the dedup is executed by a tape drive alone.

SUMMARY OF THE DESCRIBED EMBODIMENTS

The present invention relates to a method using a duplication elimination technique for data (also referred to as a record) to be written to a recording medium in a storage device. The present invention particularly relates to a technique of eliminating duplicate writing of a record already written to a tape in a tape storage device (also referred to as a tape drive).

As described above, a sequential device, for example, a tape drive has a large overhead due to moving of the tape required for comparison between data to be newly written and data on the recording medium. Thus, addition of the dedup function executed by the tape drive alone has not been taken into consideration.

An object of the present invention is to provide: a deduplication method for eliminating duplicate data recorded in a recording medium; and a storage device (a tape drive in particular) configured to implement the method. Step numbers below correspond to step numbers in FIGS. 3 and 4. An aspect of the present invention for achieving the aforementioned object is a deduplication method for eliminating duplication of a record written to a storage device. The storage device includes a first buffer and a second buffer, the first buffer storing a record number, a hash value, and a write frequency of a record recorded in a recording medium, the second buffer storing a content of the record in combination with the record number and the hash value. The method includes the steps of:

1. receiving a request to write a record (a new record) from a host;
2. calculating a hash value (new S) of the new record;
3. checking if the hash value (new S) of the new record exists in the second buffer;
4. if the new S exists in the second buffer in the checking step 3, comparing the new record with a record stored in the second buffer corresponding to the new S to check if the new record and the stored record in the second buffer match each other; and
5. if the new record and the stored record match each other (Yes) in the comparing step 4, writing a pointer (a record number) as write data of the new record to the recording medium, the pointer pointing to the record already stored in any one of the recording medium and the second buffer.

The method is characterized by further including the steps of:

if the new record and the record stored in the second buffer do not match each other (No) in the comparing step 4, incrementing the write frequency recorded in the first buffer by one (7.1), and then if the write frequency is equal to or higher than a predetermined value (7.2), storing the content of the new record in the second buffer together with the new S and the pointer (7.3); and 9. writing the new record to the recording medium after processing in the step 7.

The method is characterized by further including the steps of:

6. if the new S does not exist (No) in the second buffer in the checking step 3, checking if the new S exists in the first buffer;

if the new S exists (Yes) in the first buffer in the checking step 6, incrementing the write frequency recorded in the first buffer by one (7.1), and then if the write frequency of the new record is equal to or higher than a predetermined value (7.2), storing the content of the new record in the second buffer together with the new S and the pointer (7.3); and 9. writing the new record to the recording medium after processing in the step 7.

The method is characterized by further including the steps of:
6. if the new S does not exist in the second buffer (No) in the checking step 3, checking if the new S exists in the first buffer;
8. if the new S does not exist in the first buffer (No) in the checking step 6, storing in the first buffer a pointer and a write frequency of 1 for the new S of the new record; and
9. writing the new record to the recording medium after processing in the step 8.

The method is characterized in that the first buffer has entries in which all the records recorded in the recording medium are registered on a hash value basis, and the second buffer has entries in each of which a content of a new record having the write frequency equal to or higher than the predetermined value in the entries is stored in combination with the hash value and the pointer.

The method is characterized in that the predetermined value is determined based on a value of (a second buffer capacity)/(a recording medium capacity) and based on the number of records each of which is duplicatedly recorded in the recording medium.

The method is characterized in that the predetermined value is determined based on an upper limit value set for the number of duplicate records recorded in the recording medium.

An aspect of the present invention to achieve the object is a method of reading a recorded record from a storage device. The storage device includes a first buffer and a second buffer, the first buffer storing a record number, a hash value and a write frequency of a record recorded in a recording medium, the second buffer storing a content of the record in combination with the record number and the hash value. The method includes the steps of:
1. receiving from a host a command to read a record with a pointer designated therein;
2. reading data on the record from the recording medium;
3. checking if the data on the record is a pointer to the record recorded in the recording medium; and
4. if the data is the pointer in the checking step 3, checking if a record corresponding to the pointer exists in the second buffer;
5. if the record corresponding to the pointer exists in the second buffer in the checking step 4, reading the record from the second buffer and transmitting the record to the host.

The method is characterized by further including the steps of:
6. if the record corresponding to the pointer does not exist in the second buffer (No) in the checking step 4, reading the record on the recording medium pointed to by the pointer; and
7. reading the record as the record requested to be read and transmitting the record to the host.

Furthermore, an aspect of the present invention is a storage device for eliminating duplication of a write record. The storage device is characterized by including:
a first buffer that stores a record number, a hash value and a write frequency of a record recorded in a recording medium;
a second buffer that stores a content of the record in combination with the record number and the hash value; and
a write control unit that controls writing of a record to the recording medium.
The write control unit includes:
1. a unit that receives a request to write a record (new record) from a host,
2. a unit that calculates a hash value (new S) of the new record,
3. a unit that checks if the hash value (new S) of the new record exists in the second buffer,
4. a unit that, if the new S exists in the second buffer in the checking step 3, compares the new record with the record stored in the second buffer corresponding to (combined with) the new S to check if the new record and the stored record match each other, and
5. a unit that, if the new record and the stored record match (Yes) in the comparing step 4, writes a pointer (a record number) as write data of the new record to the recording medium, the pointer pointing to the record already stored in any one of the recording medium and the second buffer.

The aspects of the present invention provide a method for eliminating duplicate data to be written to the storage device as much as possible and enable effective usage of a large-volume storage medium.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 3 shows a flowchart of a deduplication method for eliminating a duplicate record in writing a record to a tape drive from a host; and FIG. 4 shows a flowchart of reading a record recorded by the deduplication method for eliminating a duplicate record according to the present invention.

DETAILED DESCRIPTION OF CERTAIN EMBODIMENTS

Figure 1:
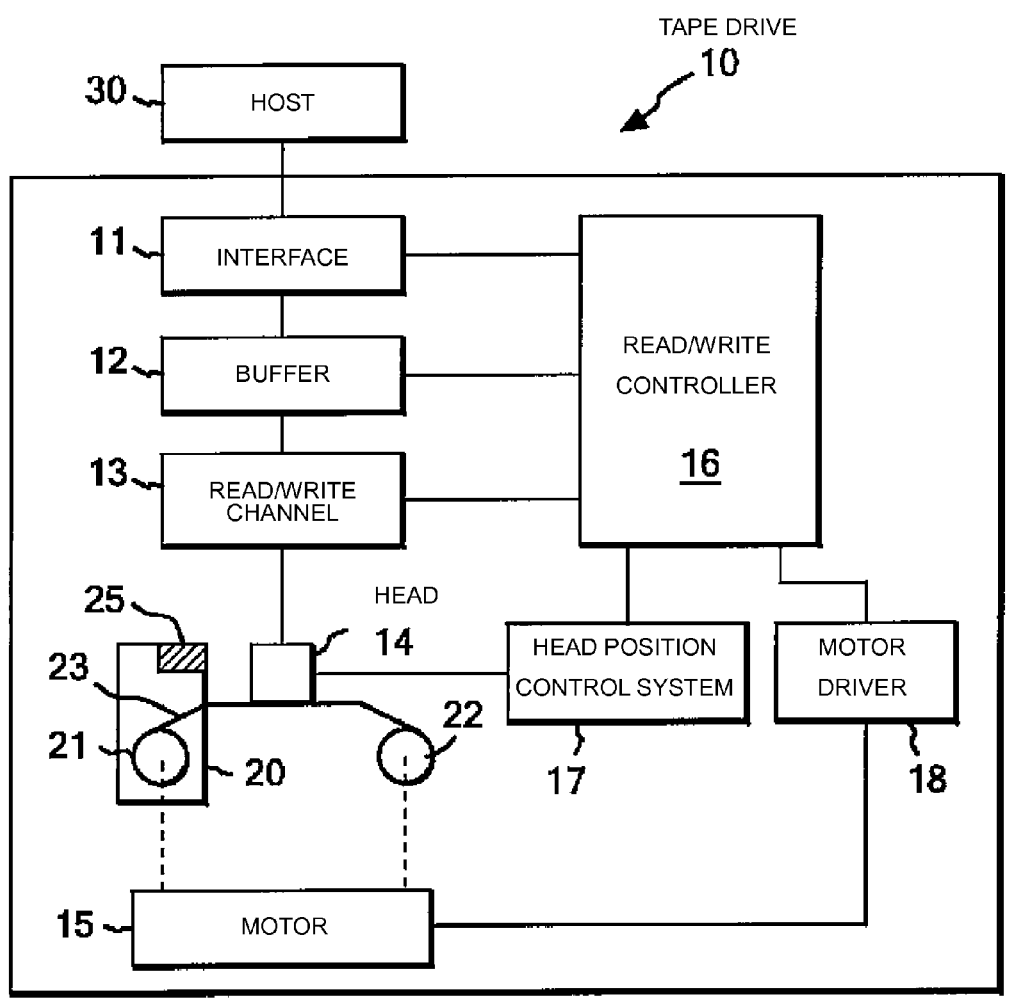
FIG. 1 shows a configuration example of a tape drive 10 to which an embodiment of the present invention is applied.

A typical embodiment (hereinafter, referred to as an "embodiment") will be described below concerning a method for eliminating duplicate data on a tape drive of the present invention. The embodiment is illustrative and does not exclude provision to a storage medium other than the tape drive.

A technique of supporting dedup by a tape drive alone has been devised. Two buffers for dedup are additionally prepared in a temporary storage area (for example, a DRAM) of a tape drive. A buffer 1 stores a table in which record numbers of already recorded records are associated with hash values of data stored in the records. A buffer 2 stores frequently used records in combination with hash values or record numbers thereof. A write frequency (also referred to as a "frequency") is the number of requests made by a host to write the same record and means the number of duplicate records of the record. A record number is an index for designating a variable-length record number by the host at the time of writing. The tape drive writes the content of the record to a tape in combination with the record number and later reads the record whose number is designated, from the tape.

When a record is written to a tape drive from the host, a hash value of the record is firstly calculated. If the hash value is stored in the buffer 2, a comparison in content is made between the record to be newly written and a record corresponding to the hash value stored in the buffer 2. If it is confirmed, as the result of the comparison, that the records are the same, the new record itself is not written, but a special record is stored which has the number of the already recorded record having the same content. A record on the tape designated by the record number thereof has the content of the record itself.

The present invention provides, as the special record, a pointer which is data to be written to the tape. The pointer includes a record number for identifying a record and a certain mark (an index) as information thereon. The inclusion of the record number in the pointer is intended to identify the record number for identifying a different record already written to the tape. The index indicating that the pointer includes the different record number is provided so that the tape drive can distinguishably know that read information includes the different record number instead of the content itself of the record transmitted by the host. Alternatively, the pointer may be a record number (an entry number) stored in the buffer 2, instead of the record number written to the tape. In this case, discrimination between the record number on the tape and a record number (entry number) stored in the buffer 2 is required in the index of the pointer. Note that the pointer has a value well smaller than an actual space required for the record itself and thus does not use a large space in the buffers 1 and 2. In a case where the buffer 1 has a capacity of about 100 MB, the buffer 1 can accommodate all the records in entries thereof as long as the records have typical record sizes and are not too many.

In order to describe the embodiment of the present invention in detail, an operation of the tape drive will be described. FIG. 1 shows a configuration example of a tape drive 10 to which the embodiment is applied to. The tape drive 10 writes and reads multiple data pieces (also referred to as records) transmitted from a host 30 to and from a recording tape medium in units of a fixed-length data set (DS). The DS is an aggregation of multiple variable-length records and has a fixed-length format structure.

The tape drive 10 includes an interface 11, a buffer 12, a read/write channel 13, a head 14, a motor 15, a reel 22 around which a tape 23 is wound, and a control system for these. The control system includes a read/write controller 16, a head position control system, and a motor driver 18. Two motors may be provided as the motor 15. A tape cartridge 20 is attachably and detachably loaded on the tape drive 10.

The tape cartridge 20 includes the tape 23 wound around a reel 21. With the rotation of the reels 21, 22, the tape 23 is moved in a longitudinal direction thereof, from the reel 21 to the reel 22, or from the reel 22 to the reel 21. A tape medium other than a magnetic tape may be used as the tape 23. The tape cartridge 20 holds information on recording attributes (called a tape directory) of data of the tape 23 in a non-volatile memory called a cartridge memory (CM) 25. The tape drive 10 reads the directory information from the CM 25 provided in the tape cartridge 20 and moves the tape 23 at a high speed to a target position with respect to the head 14. The CM 25 provided in the tape cartridge 20 is read in a non-contact manner by the tape drive 10. The CM 25 includes a memory map storing therein information on attributes of the tape cartridge 20.

The read/write controller 16 controls the tape drive 10 on the whole. Under this control, when the tape 23 moves in the longitudinal direction thereof, the head 14 writes and reads information to and from the tape 23. In addition, the motor 15 rotates the reels 21, 22. Although a single motor is shown as the motor 15, it is preferable to provide one motor for each of the reels 21, 22.

For example, the read/write controller 16 controls reading or writing data to or from the tape 23 in accordance with a command received by the interface 11. The read/write controller 16 also controls the head position control system 17 and the motor driver 18, adds a correction code to write data, and performs error correction on read data. The motor driver 18 drives the motor 15.

The interface 11 communicates with the host 30 which is an example of an upper-layer device. From the host 30, the interface 11 receives a command for moving the tape 23 to a target position, a command for writing data to the tape 23, and a command for reading data from the tape 23. The commands correspond to a positioning command, a Write command or a synchronization (Flush) command, and a Read command, respectively. Further, the interface 11 makes a response to the host 30 indicating whether processing in response to the corresponding command succeeds or fails. The host 30 designates the position of the variable-length data and the number of data pieces in a command and issues the command to the tape drive 10.

The buffer 12 is a memory in which data to be written to the tape 23 and data read from the tape 23 is accumulated. For example, the memory is configured of a DRAM. In addition, the buffer 12 is formed of multiple fixed-length buffer segments, and each buffer segment stores therein a DS which is a unit of reading from and writing to the tape 23. A single data set is constituted of: a part of one of data pieces transmitted from the host 30; or multiple data pieces. Data passed on through the read/write channel 13 is written to the tape 23 by the head 14 in DS units (for example, 40 KB or 1.6 MB). The synchronization command is a command for writing data stored in a buffer to a tape.

Figure 2:
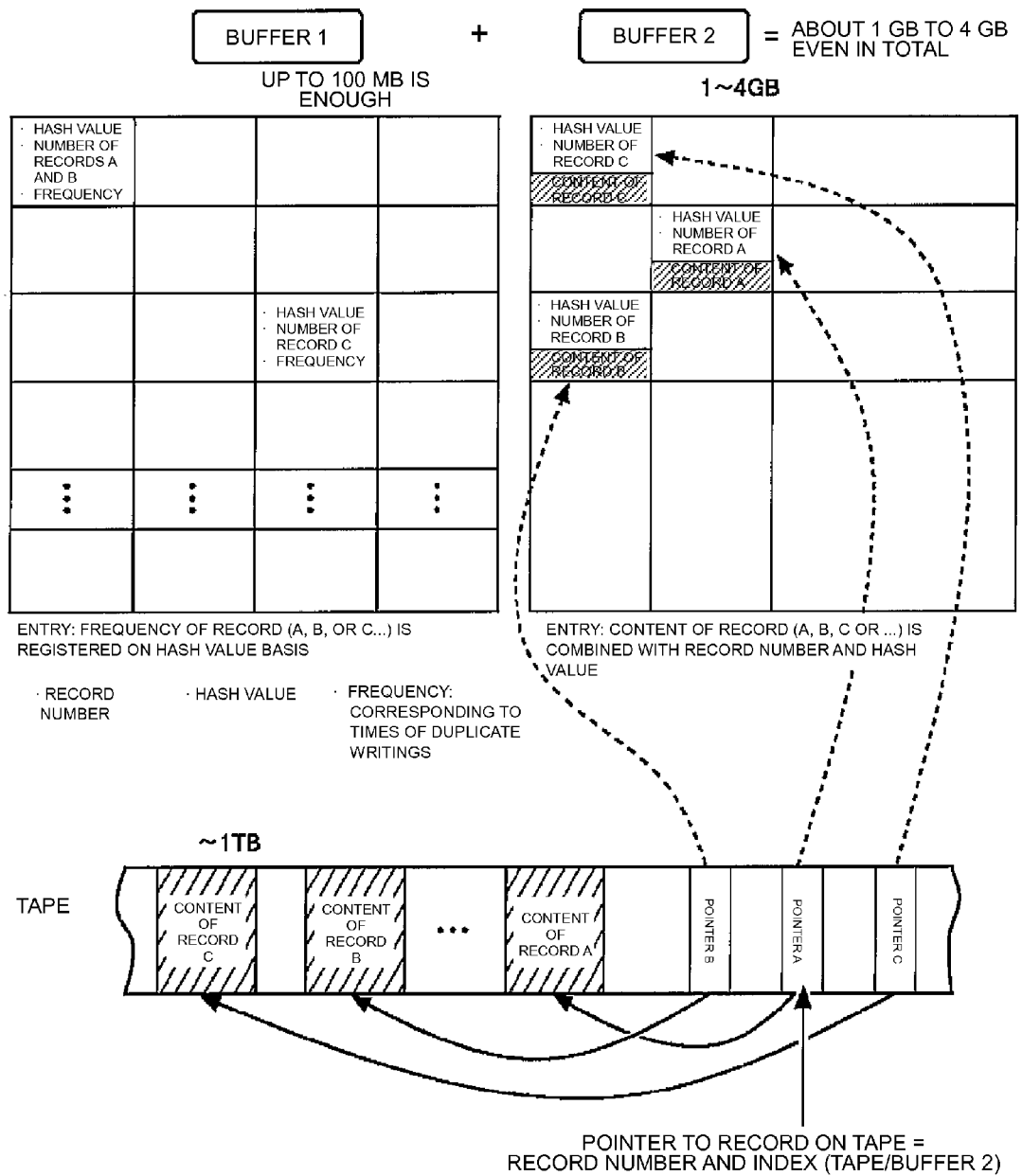
FIG. 2 shows components (a buffer 1, a buffer 2, and a tape) in the embodiment and a mechanism for reading and writing duplicate data according to the present invention.

FIG. 2 shows components in the embodiment and a mechanism for writing and reading duplicate data according to the present invention. A description is given of the embodiment of the present invention in which duplicate data of frequently appearing data is managed by using the buffers 1 and 2. A temporary storage area (a buffer, for example, a DRAM) of about 1 GB to 4 GB can be secured in the tape drive as buffers for dedup. Since a tape medium has a capacity of about 1 TB, the buffer capacity is naturally not large enough to store all the records therein. To put it differently, since the buffers have an absolutely small capacity which is 0.1% to 0.4% of the tape capacity, it is necessary to sort out records to be stored in the buffer.

The buffer 1 may store entries for respective hash values and each of the entries may further include one or more record numbers in combination with the hash values. The buffer 2 stores the contents of records themselves in addition to the hash values and the record numbers. Instead of the record numbers, the buffer 2 may include pointers for identifying respective record numbers. The buffer 1 is utilized to record hash values of all the data and write frequencies thereof. The buffer 2 is utilized to record data themselves of records whose write frequencies in the buffer 1 are determined to be high. The buffers 1 and 2 are discriminated from each other, the buffer 1 being for observing the write frequencies, the buffer 2 being for holding the records themselves. By managing the two buffers independently from each other, only data having a high frequency at any timing can be dynamically left in the buffer 2.

FIG. 2 illustrates how to manage duplicate data of frequently appearing data by using the buffers 1 and 2. In the buffer 1, a hash value and the write frequency are recorded for every record already written to the tape. Entries (fields) of the buffer 1 are sort of directories, including entries in which all the records (A, B, C, and . . . ) recorded in the tape are registered on a hash value basis. Each entry may include a record number. Even if these values are stored for all the records in the buffer 1, a buffer capacity of about 100 MB is enough. The records A and B are included in the same entry, being considered to have the same hash value. A "frequency" represents a value for any record given the same hash value. A hash value is a representative value for obtaining a value representing a variable-length record by aggregating fixed-length data having smaller digits. Note that even if records have the same hash value, the records do not necessarily have the same content ultimately. The contents themselves of the records are lastly compared with each other based on the fact that the records have the same hash value, and thereby it is confirmed that the records have the same content ultimately.

The contents of the records are stored in entries constituting the buffer 2 in combination with record numbers and hash values thereof. In FIG. 2, the contents of the records A, B, C and . . . are stored in combination with respective hash values thereof. The records A, B, and C have data having comparatively high frequencies, and thus are stored in the buffer 2. The capacity of the buffers 1 and 2 is 1 GB to 4 GB even in total, and is 0.5% or less of the capacity of the tape (up to about 1 TB). A predetermined value as a threshold of the write frequency is determined in consideration of the size of the buffer 2 relative to the total capacity of the tape. When a record has a write frequency equal to or higher than the predetermined value, the content thereof is stored in the buffer 2 in combination with a hash value and a pointer thereof. Note that in FIG. 2, for simplicity, only a record number instead of the pointer is shown in each entry. When having a write frequency equal to or higher than the predetermined value, a record is considered to be requested to be written in the future at a high possibility and thus is stored in the buffer 2. If a record having a write frequency equal to or higher than the predetermined value is held in the buffer 2 having a limited capacity, the performance in record comparison checking, the saving of the tape capacity, and the performance in reading can be enhanced. The predetermined value is provided based on a value of (the capacity of the buffer 2)/(the capacity of the tape) and based on the number of records each of which is duplicatedly recorded in the tape. Alternatively, the predetermined value may be determined based on an upper limit of the numbers of duplicate records recorded in the tape. The predetermined value may be set at at least three. When having a frequency smaller than the predetermined value, a record newly requested to be written is not stored in any of the buffers 1 and 2. Reference is only made to data thereof on the tape. When the space of the buffer 2 runs short in storing a record, the predetermined value is changed, and thereby a free space can be secured. Increasing the predetermined value makes it possible to delete even a record having been stored in the buffer 2 from the buffer, if a frequency of the record becomes smaller than the predetermined value. Even though such a record is disposed of by the deletion from the buffer 2, data integrity is guaranteed because the content of the record has been recorded in the tape corresponding to the record number itself.

A duplicate writing mechanism will be described based on FIG. 2. Upon receipt of a new record from the host, the tape drive calculates a hash value of the record stored in a data buffer. The hash value is compared with hash values stored in entries of the buffer 2 to check for the presence. The checking is made between data stored in each entry of the buffer 2 and the new record. The content of the new record does not have to be read from the tape. If there is a match in data in the checking, a pointer is written to the tape, the pointer including the record number which matches the number of the record A, B, or C already written to the tape in the entry of the buffer 2. The pointer indicates the number of the record A on the tape. If comparison checking shows that an entry including the same hash value as that of the record A does not exist in the buffer 2, this means that there is no duplicate record having a frequency equal to or higher than the predetermined value on the tape. In this case, the tape drive writes data to the tape in a general manner until the write frequency of the record reaches the predetermined value. If an entry corresponding to the new record does not exist in the buffer 1, either, an entry (a hash value, a frequency, and a record number) for the record is newly provided in the buffer 1. Meanwhile, when storing the content itself of the record in the buffer 2, the tape drive stores the content in combination with the record number and the hash value thereof. Note that only the contents of records having frequencies equal to or higher than the predetermined value are stored in the buffer 2, because of the necessity of limiting the capacity of the buffer 2. To put it differently, each record is written to the tape duplicatedly until the write frequency thereof reaches the predetermined value.

A mechanism for reading a record written according to the present invention will be described based on FIG. 2. Upon receipt of a command to read a record from the host with a record number designated, the tape drive checks if a pointer on the tape is read. If the pointer is present, it can be confirmed that there is a possibility of holding the record in the buffer 2. If a record requested to be read is present in the buffer 2, data thereof is read from the buffer 2. Original data itself on the tape does not have to be read. If the record is not present in the buffer 2, an operation of reading the data from the tape is performed in a general manner.

FIG. 3 shows a flowchart of deduplication method for eliminating a duplicate record in writing a record to the tape drive. (1) The tape drive receives a request to write a record from the host. (2) The tape drive calculates a hash value (new S) of the new record. (3) The tape drive checks if the new S exists in the buffer 2. Alternatively, the tape drive may determine that the content of the record having S exists in the buffer 2 if the frequency corresponding to S is equal to or higher than the predetermined value in the buffer 1. (4) If the tape drive determines that the new S exists in the buffer 2 in the checking step (3), the tape drive makes a comparison to check if there is a match between the new record and the record combined with the new S in a corresponding entry in the buffer 2. (5) If there is a match (Yes) between the new record and the record stored in the buffer 2 in the checking step (4), a pointer including the number of the record whose data is already written to the tape is written to the tape as write data of the new record. With reference to FIG. 2, in order to secure pointers A, B, and C to be written to the tape, numbers of the records A, B, and C stored in the respective entries in the buffer 2 can be utilized. The pointers each include an index thereof so that the tape drive can later determine that read data is a record number. (6) If the new S does not exist in the buffer 2 (No) in the step (3), the tape drive checks if the new S exists in the buffer 1.

(7.1) If the new S exists in the buffer 1 (Yes) in the checking step (6), or if there is no match (No) between the new record and the record stored in the buffer 2 in the checking step (4), the tape drive increments a counter for the frequency in the corresponding entry by one. The frequency indicates a frequency of writing a record having the same hash value. (7.2) The tape drive checks if the frequency of the new record stored in the buffer 1 is equal to or higher than the predetermined value. (7.3) If the frequency is equal to or higher than the predetermined value (Yes) in the checking step (7.2), the tape drive stores the content of the new record in the buffer 2 together with the new hash value and the number of the new record. (8) If the new S does not exist in the buffer 1 in the checking step (6), the tape drive stores in the buffer 1 the record number and the frequency=1 for the new S of the new record. (9) The tape drive writes the new record to the tape. The tape drive writes the new record to the tape after processing in the step (8). If the write frequency of the new record is equal to or lower than the predetermined value (No) in the checking step (7.2), the tape drive skips the storing of the number and the content of the new record in the buffer 2. Thereafter, the tape drive performs record writing to the tape in a general manner in this step (9). In the general writing, the same record is allowed to be written to the tape until the frequency reaches the predetermined value. Since a restrictive value of the buffer 2 with respect to the tape capacity is 1% or less, it is not practical to completely eliminate writing a duplicate record. The method according to the present invention makes it possible to set an upper limit value of the times of duplicating records for a large-volume storage device, and thus has a significance in terms of enabling effective utilization of the capacity thereof.

FIG. 4 shows a flowchart of reading a record recorded by the deduplication method for eliminating duplicate data according to the present invention. As an implementation example, a description is given of steps in a reading method in a behavior of the tape drive in reading data from the host to the tape drive. (10) The tape drive receives a request to read a record from the host. The host issues a command to read the record to the tape drive with the record number thereof designated. (11) The tape drive reads the designated record from the tape. (12) The tape drive checks if the read record is a pointer to a record recorded in the tape. If the read data is a pointer, a predetermined index shows that the read data is the record number. Note that the index indicates either the record number or an entry number in the buffer 2. If the index indicates a record on the tape, a record designated with the record number is to be read. If the index indicates a record in the buffer 2, the content of a record in an entry designated with the entry number in the buffer 2 is to be read. Note that if the read data is not a pointer (No) in the step (12), the record is read from the tape in a step (16) in the general manner. (13) If the read data is a pointer (Yes) in the step (12), the tape drive checks if a record corresponding to the pointer exists in the buffer 2. (14) If the record exists (Yes) in the step (13), the tape drive reads the record stored in the buffer 2 corresponding to the pointer, and transmits the record to the host. If the pointer is an index to an entry in the buffer 2, a record designated with the entry number thereof is to be read. (15) If the record does not exist (No) in the step (13), the tape drive reads a record pointed by the pointer from the tape. This is a case where it is confirmed that the pointer is used as an index for the record number of the record on the tape. Based on the index, the tape drive determines that a record designated with the record number thereof read from the tape should be read. (16) The tape drive transmits the record read in the general manner to the host. The tape drive transmits the record read in the reading step (15) to the host; If the record is not a pointer (No) in the checking step (12), the tape drive transmits the read record to the host.

In holding the contents in the buffers 1 and 2, a special data set (housekeeping data set) for holding a detailed tape directory by the existing tape drive can be utilized. When a tape cartridge is taken out of the tape drive, the tape drive stores the contents of the entries in the buffers 1 and 2 in the data set. This can be achieved by fetching the contents of the buffers 1 and 2 from the special data set recorded in the tape immediately after the tape is inserted into the tape drive, by use of a technique of reading a tape directory. When a non-volatile memory (for example, the CM) is utilized, the tape drive can continue to hold the contents of the buffers 1 and 2 even though an operation of taking the tape medium out from the tape drive is performed.

The deduplication method according to the present invention enables omission of access to the tape, and thus enables dedup without giving a large impact on the writing performance, so that the tape capacity can be effectively utilized.

The aforementioned embodiment of the present invention has been described concerning the tape drive which is a typical sequential device. The two random-access temporary storage devices distinguished from each other have a total of capacities less than 1% of the main storage device capacity. Utilizing the temporary storage areas as in the present invention is advantageous in that the writing times of a duplicate record can be managed. Therefore, the range to which the present invention is applicable is not limited to the tape drive. The present invention is applicable to a random-access storage device, typically to a DASD.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A deduplication method for eliminating duplication of a record written to a storage device comprising a first buffer, a second buffer, and a recording medium for long-term data storage, the first buffer storing a record number, a hash value, and a write frequency of a record that is recorded for long term storage in the recording medium, the second buffer storing a content of the record in combination with the record number and the hash value, the method comprising the steps of:
   receiving a request to write a new record from a host;
   calculating a hash value (new S) of the new record;
   checking if the new S exists in the second buffer;
   if the new S exists in the second buffer such that the new record and a record stored in the second buffer include the same hash value, comparing the new record with the stored record corresponding to the same hash value to determine if the new record and the stored record are the same record;
   if the new record and the stored record are the same record, writing a pointer (a record number) as write data of the new record to the recording medium, the pointer pointing to the record already stored in one of the recording medium and the second buffer; and
   if the new record and the stored record include the same hash value and are different records, incrementing a first frequency associated with the new record without incrementing second frequency associated with the stored record.

2. The method according to claim 1, further comprising the steps of:
   if the new record and the record stored in the second buffer do not match each other in the comparing step, incrementing the write frequency recorded in the first buffer by one, and then if the write frequency is equal to or higher than a predetermined value, storing the content of the new record in the second buffer together with the new S and the pointer; and
   writing the new record to the recording medium after processing in the storing step.

3. The method according to claim 1, further comprising the steps of:
   if the new S does not exist in the second buffer in the checking step, checking if the new S exists in the first buffer; if the new S exists in the first buffer in the checking step, incrementing the write frequency recorded in the first buffer by one, and then if the write frequency of the new record is equal to or higher than a predetermined value, storing the content of the new record in the second buffer together with the new S and the pointer; and
   writing the new record to the recording medium after processing in the storing step.

4. The method according to claim 1, further comprising the steps of:
   if the new S does not exist in the second buffer in the checking step, checking if the new S exists in the first buffer; if the new S does not exist in the first buffer in the checking step performed on the first buffer, storing in the first buffer a pointer and a write frequency of 1 for the new S of the new record; and
   writing the new record to the recording medium after processing in the storing step performed on the first buffer.

5. The method according to claim 1, wherein the first buffer has entries in which all the records recorded in the recording medium are registered on a hash value basis, and the second buffer has entries in each of which a content of a new record having the write frequency equal to or higher than the predetermined value in the entries is stored in combination with the hash value and the pointer.

6. The method according to claim 5, wherein the predetermined value is determined based on a value of (a second buffer capacity)/(a recording medium capacity) and based on the number of records each of which is duplicatedly recorded in the recording medium.

7. The method according to claim 6, wherein the predetermined value is determined based on an upper limit value set for the number of duplicate records recorded in the recording medium.

8. A storage device that eliminates duplication of a write record, comprising:
a recording medium for long-term data storage;
a first buffer that stores a record number, a hash value and a write frequency of a record that is recorded in the recording medium;
a second buffer that stores a content of the record in combination with the record number and the hash value; and
a write control unit that controls writing of a record to the recording medium, wherein the write control unit comprises:
a unit that receives a request to write a record (new record) from a host, a unit that calculates a hash value (new S) of the new record,
a unit that checks if the new S exists in the second buffer,
a unit that, if the new S exists in the second buffer such that the new record and a record stored in the second buffer include the same hash value, compares the new record with the stored record corresponding to the same hash value to determine if the new record and the stored record are the same record,
a unit that, if the new record and the stored record are the same record, writes a pointer (a record number) as write data of the new record to the recording medium, the pointer pointing to the record already stored in one of the recording medium and the second buffer, and
a unit that, if the new record and the stored record include the same hash value and are different records, incrementing a first frequency associated with the new record without incrementing a second frequency associated with the stored record.

9. The storage device according to claim 8, wherein the write control unit further comprises:
a unit that, if the new record and the record stored in the second buffer do not match each other in the comparing step, increments the write frequency recorded in the first buffer by one, and then if the write frequency is equal to or higher than a predetermined value, stores the content of the new record in the second buffer together with the new S and the pointer; and
a unit that writes the new record to the recording medium after processing in the storing step.

10. The storage device according to claim 8, wherein the write control unit further comprises:
a unit that, if the new S does not exist in the second buffer in the checking step, checks if the new S exists in the first buffer;
a unit that, if the new S exists in the first buffer in the checking step, increments the write frequency recorded in the first buffer by one, and then if the write frequency of the new record is equal to or higher than a predetermined value, stores the content of the new record in the second buffer together with the new S and the pointer; and
a unit that writes the new record to the recording medium after processing in the storing step.

11. The storage device according to claim 8, wherein the write control unit further comprises:
a unit that, if the new S does not exist in the second buffer in the checking step, checks if the new S exists in the first buffer;
a unit that, if the new S does not exist in the first buffer in the checking step performed on the first buffer, stores in the first buffer a pointer and a write frequency of 1 for the new S of the new record; and
a unit that writes the new record to the recording medium after processing in the storing step performed on the first buffer.

12. The storage device according to claim 8, wherein the first buffer has entries in which all the records recorded in the recording medium are registered on a hash value basis, and the second buffer has entries in each of which a content of a new record having the write frequency equal to or higher than the predetermined value in the entries is stored in combination with the hash value and the pointer.

13. The storage device according to claim 12, wherein:
the predetermined value is determined based on a value of (a second buffer capacity)/(a recording medium capacity) and based on the number of records each of which is duplicatedly recorded in the recording medium; and
the predetermined value is determined based on an upper limit value set for the number of duplicate records recorded in the recording medium.

14. A computer program product for eliminating duplication of a record written to a storage device comprising a first buffer, a second buffer, and a recording medium for long-term data storage, the first buffer storing a record number, a hash value, and a write frequency of a record that is recorded for long term storage in the recording medium, the second buffer storing a content of the record in combination with the record number and the hash value, the computer program product comprising a non-transitory computer-readable storage medium having computer-readable program code portions stored therein, the computer-readable program code portions comprising:
a first executable portion for receiving a request to write a new record from a host;
a second executable portion for calculating a hash value (new S) of the new record;
a third executable portion for checking if the new S exists in the second buffer;
a fourth executable portion for, if the new S exists in the second buffer such that the new record and a record stored in the second buffer include the same hash value, comparing the new record with the stored record corresponding to the same hash value to determine if the new record and the stored record are the same record;
a fifth executable portion for, if the new record and the stored record are the same record, writing a pointer (a record number) as write data of the new record to the recording medium, the pointer pointing to the record already stored in one of the recording medium and the second buffer; and
a sixth executable portion for, if the new record and the stored record include the same hash value and are different records, incrementing a first frequency associated with the new record without incrementing a second frequency associated with the stored record.

15. The computer program product according to claim 14, further comprising a seventh executable portion for:
if the new record and the record stored in the second buffer do not match each other in the comparing step, incrementing the write frequency recorded in the first buffer by one, and then if the write frequency is equal to or higher than a predetermined value, storing the content of the new record in the second buffer together with the new S and the pointer; and writing the new record to the recording medium after processing in the storing step.

16. The computer program product according to claim 14, further comprising a seventh executable portion for:
if the new S does not exist in the second buffer in the checking step, checking if the new S exists in the first buffer; if the new S exists in the first buffer in the checking step, incrementing the write frequency recorded in the first buffer by one, and then if the write frequency of the new record is equal to or higher than a predetermined value, storing the content of the new record in the second buffer together with the new S and the pointer; and writing the new record to the recording medium after processing in the storing step.

17. The computer program product according to claim 14, further comprising a seventh executable portion for:
if the new S does not exist in the second buffer in the checking step, checking if the new S exists in the first buffer; if the new S does not exist in the first buffer in the checking step performed on the first buffer, storing in the first buffer a pointer and a write frequency of 1 for the new S of the new record; and writing the new record to the recording medium after processing in the storing step performed on the first buffer.

18. The computer program product according to claim 14, wherein the first buffer has entries in which all the records recorded in the recording medium are registered on a hash value basis, and the second buffer has entries in each of which a content of a new record having the write frequency equal to or higher than the predetermined value in the entries is stored in combination with the hash value and the pointer.

19. The computer program product according to claim 18, wherein the predetermined value is determined based on a value of (a second buffer capacity)/(a recording medium capacity) and based on the number of records each of which is duplicatedly recorded in the recording medium.

20. The computer program product according to claim 19, wherein the predetermined value is determined based on an upper limit value set for the number of duplicate records recorded in the recording medium.

* * * * *